(12) United States Patent
García Maestre et al.

(10) Patent No.: US 8,826,614 B2
(45) Date of Patent: Sep. 9, 2014

(54) SYSTEM FOR JOINING A GONDOLA TO THE CONCRETE TOWER OF AN AEROGENERATOR

(75) Inventors: Iván García Maestre, Navarra (ES); Eduardo Azanza Ladrón, Navarra (ES); José Miguel García Sayés, Navarra (ES); Miguel Nuñez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 181 days.

(21) Appl. No.: 12/820,428

(22) Filed: Jun. 22, 2010

(65) Prior Publication Data
US 2010/0325986 A1 Dec. 30, 2010

(30) Foreign Application Priority Data
Jun. 24, 2009 (ES) .................................. 200930350

(51) Int. Cl.
| | |
|---|---|
| *E04H 12/00* | (2006.01) |
| *E04C 5/08* | (2006.01) |
| *E04C 3/00* | (2006.01) |
| *E04H 12/16* | (2006.01) |
| *F03D 1/00* | (2006.01) |
| *E04H 12/12* | (2006.01) |
| *E04H 12/08* | (2006.01) |
| *F03D 11/04* | (2006.01) |

(52) U.S. Cl.
CPC *F03D 1/00* (2013.01); *E04H 12/16* (2013.01); *E04H 12/12* (2013.01); *E04H 12/085* (2013.01); *F03D 11/04* (2013.01); *Y02E 10/728* (2013.01)

USPC .................. 52/223.5; 52/296; 52/40; 52/849

(58) Field of Classification Search
USPC ................. 52/223.5, 296, 295, 848, 40, 878, 52/745.04; 290/44, 55; 384/613; 248/618, 248/620, 623, 638; 416/244 R, 244 A, 246, 416/DIG. 6, 170 R, 174, 169 R, 213.1, 214.1; 415/213.1, 214.1
See application file for complete search history.

(56) References Cited

U.S. PATENT DOCUMENTS

| | | | | |
|---|---|---|---|---|
| 1,121,208 | A * | 12/1914 | Sultemeyer | .................. 384/504 |
| 2,374,624 | A * | 4/1945 | Schwendt | .................. 52/223.5 |
| 4,166,347 | A * | 9/1979 | Pohlman et al. | ............. 52/223.4 |

(Continued)

FOREIGN PATENT DOCUMENTS

| | | | | |
|---|---|---|---|---|
| EP | 1474579 | | 11/2004 | |
| EP | 1654460 | | 5/2006 | |
| EP | 1947328 | | 7/2008 | |
| WO | WO 2005015013 | A1 * | 2/2005 | ............. F03D 11/04 |

*Primary Examiner* — Elizabeth A Plummer
(74) *Attorney, Agent, or Firm* — Ostrolenk Faber LLP

(57) ABSTRACT

The present disclosure describes a system for joining a gondola to the concrete tower of an aerogenerator, wherein the concrete tower is formed by a lower annular section, one or several intermediate annular sections and an upper annular section, including a flat annular support which is inserted between an upper surface of the upper annular section of the tower and the lower surface of a yaw bearing that supports the gondola, the flat annular support comprising orifices wherethrough a plurality of joining means pass, each of which is fixed to the bottom of the upper annular section of the tower and to the bottom of the yaw bearing.

13 Claims, 5 Drawing Sheets

(56) References Cited

U.S. PATENT DOCUMENTS

| | | | |
|---|---|---|---|
| 4,395,140 A * | 7/1983 | Sable | 384/99 |
| 5,501,048 A * | 3/1996 | Nakanishi | 52/296 |
| 5,809,711 A * | 9/1998 | Werner | 52/223.2 |
| 7,155,875 B2 * | 1/2007 | Henderson | 52/741.15 |
| 7,343,718 B2 * | 3/2008 | Foust et al. | 52/745.17 |
| 7,431,567 B1 * | 10/2008 | Bevington et al. | 416/244 R |
| 7,694,473 B2 * | 4/2010 | Jakubowski et al. | 52/223.4 |
| 7,739,843 B2 * | 6/2010 | Cortina-Cordero | 52/223.5 |
| 7,877,944 B2 * | 2/2011 | Seidel | 52/296 |
| 8,021,101 B2 * | 9/2011 | Segovia et al. | 415/4.3 |
| 8,210,507 B2 * | 7/2012 | Mitsch | 267/141.1 |
| 8,371,030 B2 * | 2/2013 | Shiraishi et al. | 29/889.1 |
| 2003/0039419 A1 * | 2/2003 | Wobben | 384/275 |
| 2003/0116970 A1 * | 6/2003 | Weitkamp et al. | 290/44 |
| 2005/0129504 A1 | 6/2005 | De Roest | |
| 2007/0006541 A1 | 1/2007 | Seidel | |
| 2008/0209842 A1 * | 9/2008 | Montaner Fraguet et al. | 52/651.07 |
| 2008/0285903 A1 * | 11/2008 | Olsen | 384/516 |
| 2010/0126079 A1 * | 5/2010 | Kristensen | 52/40 |
| 2010/0132282 A1 * | 6/2010 | Voss | 52/223.5 |
| 2011/0138706 A1 * | 6/2011 | Voss et al. | 52/173.1 |
| 2011/0223035 A1 * | 9/2011 | Paura et al. | 416/244 R |
| 2012/0009063 A1 * | 1/2012 | Noda et al. | 416/9 |
| 2012/0025538 A1 * | 2/2012 | Luneau et al. | 290/55 |
| 2013/0081350 A1 * | 4/2013 | Bogl et al. | 52/651.01 |

\* cited by examiner

SYSTEM FOR JOINING A GONDOLA TO THE CONCRETE TOWER OF AN AEROGENERATOR

OBJECT OF THE INVENTION

The object of the present invention is a simple, quick and cheap system for joining the gondola of an aerogenerator to the last section of a concrete tower. To this end, a flat annular support is fixed to the yaw bearing that supports the gondola and to the upper concrete section of the tower by means of pass-through bolts and/or tension cables.

BACKGROUND OF THE INVENTION

The evolution of wind power generation technology is currently aimed at designing aerogenerators with increasingly larger power outputs, which implies an increase in the size of the constituent parts of the aerogenerators. The development of higher towers must be carried out taking into account a set of design criteria, such as load, resistance of the material and dynamic performance, in addition to construction, transport and installation conditions.

Towers up to 80 m in height are usually manufactured from tubular metal sections. However, it has been verified that more resistant and rigid structures are required as of this height, due to the increased load they must bear and the resonant frequency of the structure. A possible solution is the use of lower metallic sections of greater diameter and/or thickness. However, this has different drawbacks related to transport problems and an excessive increase in manufacturing costs. For this reason, the use of concrete to build the tower is an attractive alternative. However, there is a wide range of problems related to the joining of the last concrete section to the gondola of the aerogenerator and particularly to the bearing that allows the gondola to rotate around a vertical rotation axis, in order for the turbine of the aerogenerator to orient itself in accordance with the direction of the wind. This bearing is normally called "yaw bearing."

The yaw bearing has a diameter of between 2 m and 2.3 m, depending on the size of the machine, and supports both the weight of the gondola and aerogenerator rotor and the loads deriving from the action of the wind on the rotor. For this reason, the yaw bearing imposes stringent requirements on the surface that supports it, basically in terms of flatness and resistance.

In relation to flatness, the tolerance relative to surface flatness is typically 0.25 mm, which is impossible to obtain in concrete parts. Additionally, with the object of facilitating transport of the tower sections that constitute a concrete tower, each section may in turn be formed by several adjacent modules fixed together by vertical joints, such as for example in EP1474579. In these cases, the flatness requirement for yaw bearing seating would require a perfect vertical alignment of the adjacent modules, which is difficult to achieve given the dimensions (greater than 15 m) and weight (tens of tonnes) of said modules.

With regard to resistance, and particularly when the final section of the tower that supports the bearing is made of concrete, there is the added problem of distributing tension as evenly as possible. We must point out that the bearing support surface is considerably smaller than the support surface of the concrete section and that, in addition to axial tension, tangential tension also appears, caused by the action of the wind and rotation of the rotor. Additionally, the yaw bearing is manufactured from steel, a substantially more resistant and rigid material than the conventional concrete used in the construction of aerogenerator towers.

For these reasons, use of an intermediate part that is sufficiently flat and distributes stress evenly in the concrete is required. At present, a cylindrical metal part having upper and lower clamps that serve to join it respectively to the yaw bearing and to the concrete section by means of screws or bolts is normally used. For example, EP1474579 discloses a part of this kind, frequently called "mast" in the state of the art.

In order to improve the joint between the cylindrical part and the concrete section, joining systems have also been disclosed wherein the lower portion of the metal cylinder is embedded in the concrete. However, a drawback of this system is that the stress transmitted by the cylindrical part to the concrete may lead to the appearance of cracks in stress concentration points due to fatigue. EP1654460 and EP1947328 describe cylindrical joining parts of this kind.

DESCRIPTION

The present invention describes a joining system that overcomes the aforementioned drawbacks thanks to the use of a flat annular support. In this manner, the problem addressed can be solved in a faster and cheaper manner, as both the assembly and manufacture of this novel joining part are simpler than those of the masts of the prior state of the art.

In the present document, the concrete tower is understood to be formed by a plurality of annular concrete sections called, respectively from the base to the top of the tower: lower annular section, intermediate annular sections and upper annular section. Therefore, the system of the invention comprises a flat annular support that is inserted between an upper surface of the upper annular section of the tower and the lower surface of the yaw bearing that supports the gondola, said support comprising orifices wherethrough a plurality of joining means pass, each of which is fixed to the bottom of the upper annular section of the tower and to the top of the yaw bearing.

The flat annular support is manufactured from a highly resistant material, which may be both metallic and made of high-resistance epoxy resins, mortars or concretes. Said support may be mechanised to achieve sufficient flatness for correctly supporting the yaw bearing.

The installation of the flat annular support allows separation of the manufacturing and assembly tolerances of the large constituent concrete parts of the tower, which are associated with mould tolerances, concrete retraction, assembly tolerances, etc., from the tolerances for correctly supporting the yaw bearing. On the other hand, yaw bearing tension is evenly distributed over the upper surface of the upper annular section of the tower by means of the flat annular support, despite the fact that the support surface of the yaw bearing is considerably smaller than the upper surface of the upper annular section of the tower.

Preferably, the joining means are evenly distributed over the flat annular support, altogether defining at least one circumference inscribed on the surface of said annular support. In accordance with other preferred embodiments of the invention, the joining means may be bolts and/or tension cables.

In accordance with still another preferred embodiment, at least the upper annular section of the aerogenerator tower is formed from several adjacent prefabricated modules disposed in such a manner that it has at least one joint on its upper surface. As mentioned earlier, the fact that the upper annular section of the tower is formed from several modules joined by substantially vertical joints reaching up to the upper surface of said annular section makes it even more difficult to achieve a sufficiently flat upper surface for supporting the yaw bearing.

When the gondola is oriented so that the rotation axis of the rotor is aligned with the direction of the wind, a blocking system must be disposed to prevent the gondola from becoming disoriented due to the stress to which the wind subjects the rotor. A usual blocking system is to dispose a brake disc fixed to the tower and brake callipers fixed to the gondola frame. In this case, in accordance with still another preferred embodiment of the invention, the system comprises a brake disc disposed between the lower surface of the yaw bearing and the upper surface of the upper module. Evidently, in this case the brake disc must have orifices corresponding with the orifices of the flat annular support to allow passage of the fixing means. Another preferred option is to manufacture the brake disc and annular support as a single integral piece.

With the object of further improving the fixation between the yaw bearing and the upper module, it is possible to use a plurality of additional tension cables that penetrate the upper annular section, fixed to the top of the flat annular support and to the bottom of the immediately lower intermediate annular section. These additional tension cables also have the advantage of compressing the upper annular concrete section, thereby avoiding the need to use pre-tensioned annular sections, both in the case of single-piece sections and sections formed by two or more adjacent prefabricated modules.

Additionally, it is possible to generalise this concept so that each intermediate annular section of the tower comprises a plurality of additional tension cables that penetrate it and which are fixed to the top of the immediately upper intermediate section and to the bottom of the foundation whereon the tower rests.

According to still another preferred embodiment of the invention, the additional tension cables are evenly distributed over the annular sections, altogether defining at least one circumference inscribed on the surface of said annular sections.

Finally, according to another preferred embodiment, in order to improve the contact between the flat annular support and the upper surface of the upper annular section of the tower, the joint is filled with high-resistance resin or mortar.

PREFERRED EMBODIMENT OF THE INVENTION

Figure 1:
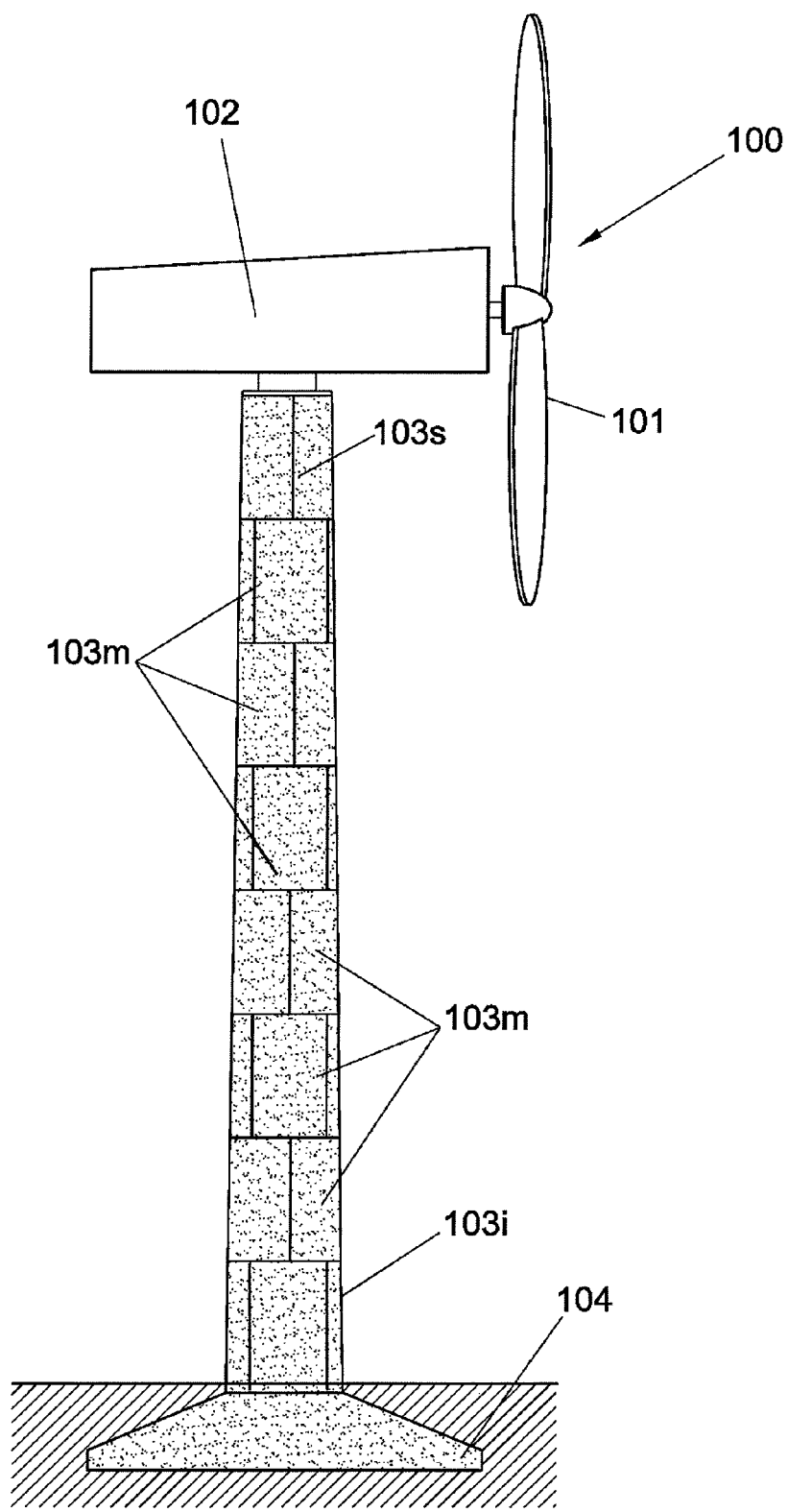
FIG. 1 shows a diagram of an aerogenerator of the concrete tower where its different constituent parts can be observed.
Figure 7:
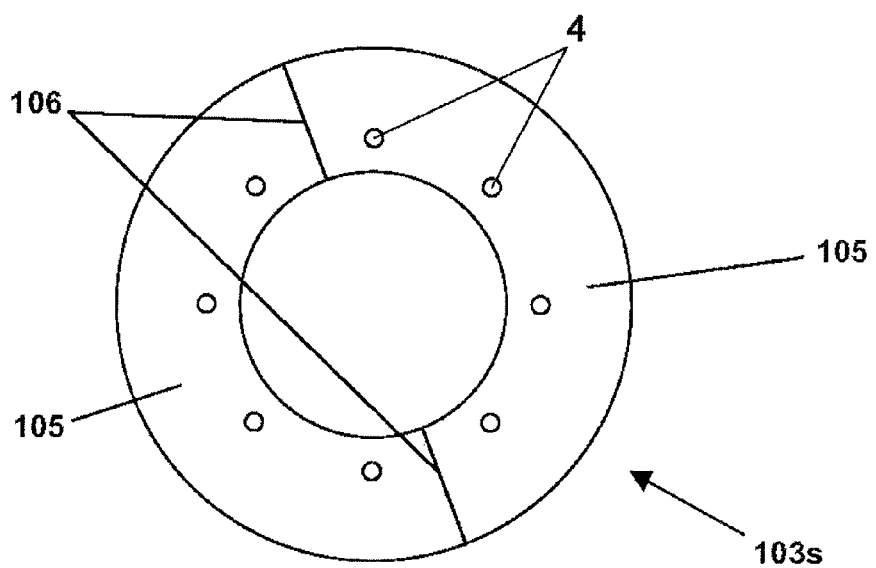
FIG. 7 shows a plan view of the upper annular section of the example of FIG. 4.

Some particular embodiments of the system (1) of the invention are described below, making reference to the attached figures. FIG. 1 represents the general diagram of an aerogenerator (100), wherein its constituent parts can be clearly observed: the aerogenerator (100) is formed by the rotor (101), the gondola (102) and the concrete tower (103). In turn, the concrete tower (103) is formed by an array of annular sections divided into an upper annular section (103s), intermediate annular sections (103m) and a lower annular section (103i), in addition to foundation (104) where at least the upper annular section (103s) of the tower (103) is formed by several adjacent prefabricated modules (105) disposed in such a manner that it has at least one joint (106) on its upper surface as is shown in FIG. 7.

Figure 3:
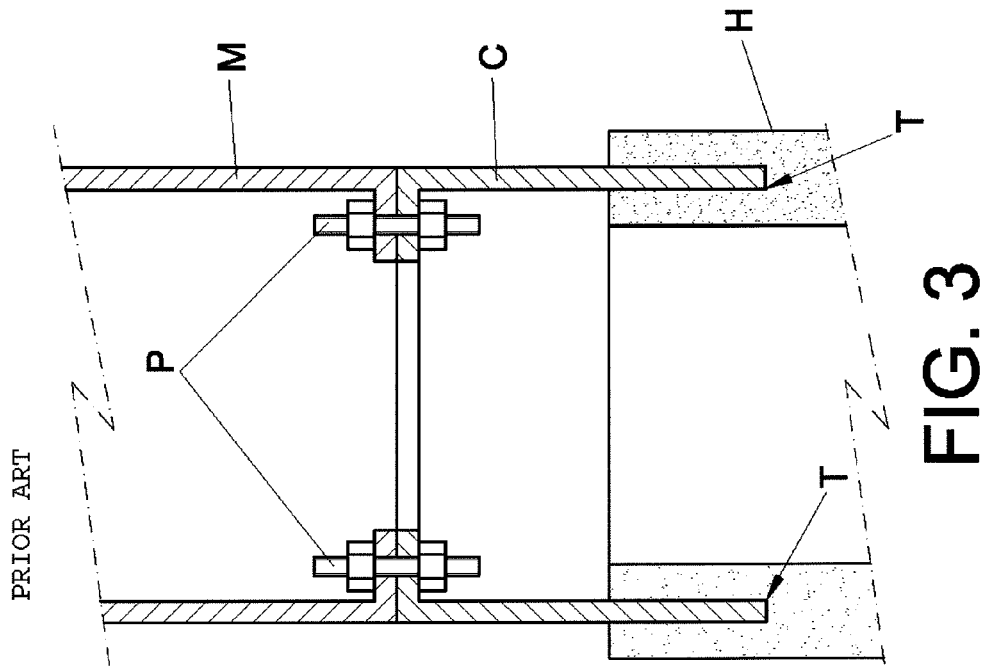
FIGS. 2 and 3 show two joining systems in accordance with the prior art.
Figure 2:
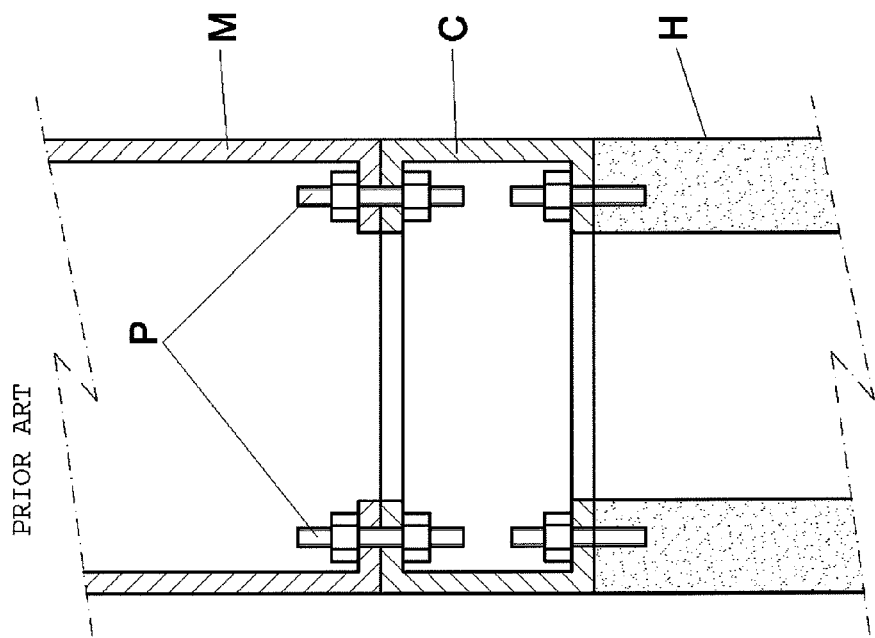

FIGS. 2 and 3 show examples of joining systems used in the prior art. Specifically, FIG. 2 shows a system that uses a mast (C) to establish the joint between a metallic section (M) and a concrete section (H) of a tower, where bolts are used to join parts by means of upper and lower clamps of the mast (C). FIG. 3, on the other hand, shows a system where the lower portion of the mast (C) lacks a clamp and is rather embedded into the concrete (H) section. As a consequence of this layout, tension (T) concentration points appear which cause the appearance of cracks and weakening of the annular concrete section.

Figure 4:
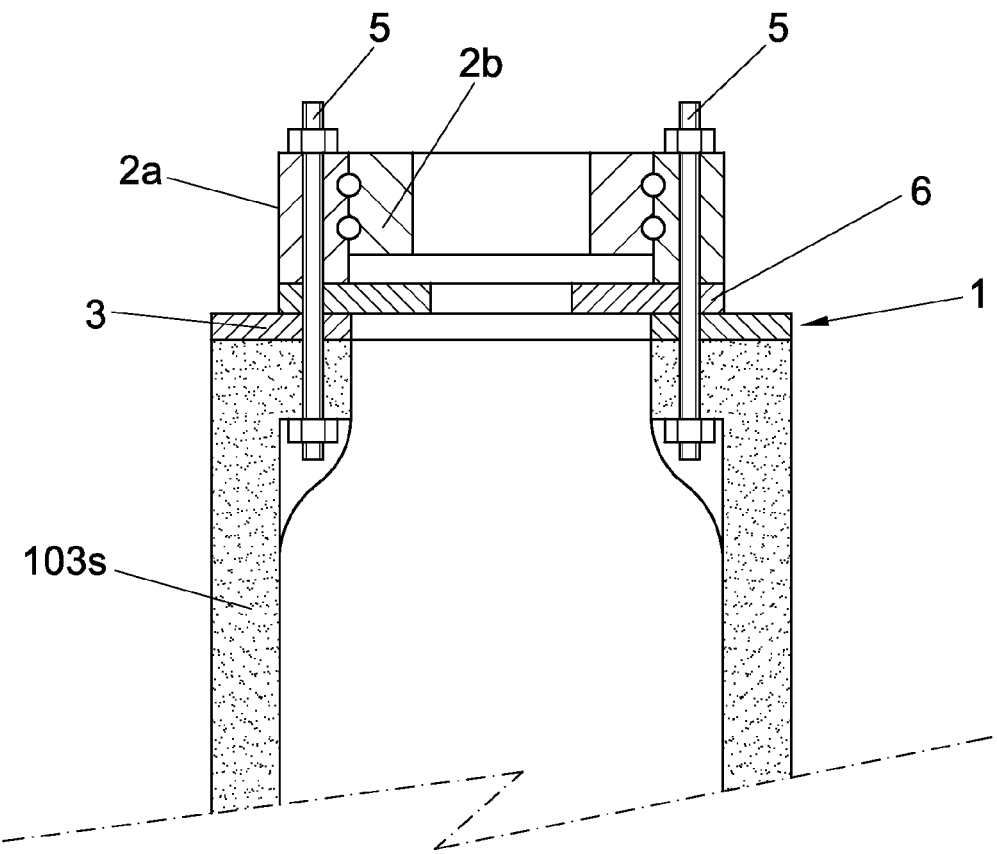
FIG. 4 shows a first example of the joining system in accordance with the present invention.
Figure 5:
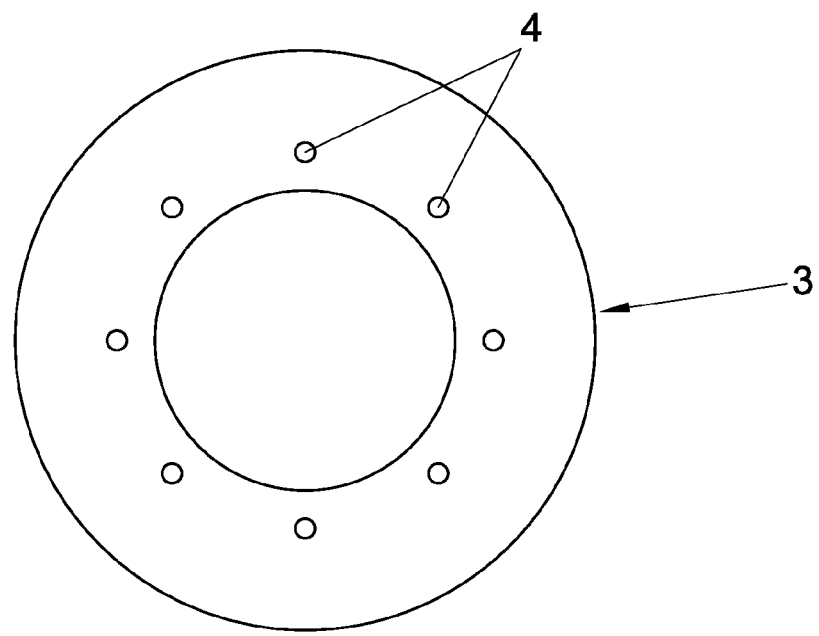
FIG. 5 shows a plan view of the flat annular support of the example of FIG. 4.

FIGS. 4 and 5 show a first embodiment of a joining system (1), in accordance with the present invention. FIG. 4 shows an upper annular section (103s) of a tower (103) which is fixed to the yaw bearing (2) by means of a flat annular support (3) having orifices (4) wherethrough fixing means pass (5), which in this example are bolts.

The yaw bearing (2) has a fixed part (2a) to the top of which the fixing means (5) are fixed and a mobile part (2b), the fixed part (2a) resting upon a brake disc (6) while the mobile part (2b) is coupled to the gondola frame (102) to allow rotation thereof around a vertical rotation axis. The brake disc (6), despite its name, is ring shaped, thereby leaving space for brake callipers fixed to the gondola frame (102) to apply pressure thereon and immobilise the gondola (102) in the adequate direction. Additionally, on being annular, the brake disc (6) allows the passage of operators to the interior of the gondola (102) for carrying out maintenance and repair work. Additionally, in this figure we can observe how the yaw bearing (2) support surface is smaller than the upper surface of the upper annular concrete section (103s). We can also observe how the thickness of the upper end of the upper annular section (103s) ends in a section where it widens, thereby increasing the contact surface between said upper annular section (103s) and the flat annular support (3), which in turn contributes to a better distribution of the tensions in the concrete.

FIG. 5 shows a plan view of the flat annular support (3) where we can observe how the orifices (4) are evenly distributed throughout a circumference inscribed in the flat annular support (3), thereby evenly distributing the tensions created by the fixing means (5). This configuration is understood to have certain usual variations in the art: for example, when there is insufficient space in a single circumference, orifices (4) can be disposed in a zigzag arrangement, i.e. wherein the centres thereof define two concentric circumferences. As mentioned earlier, it is possible to manufacture the upper annular section (103s) so as to contain cavities for housing the lower end of the fixing means (5), allowing the use of nuts or similar.

Figure 6:
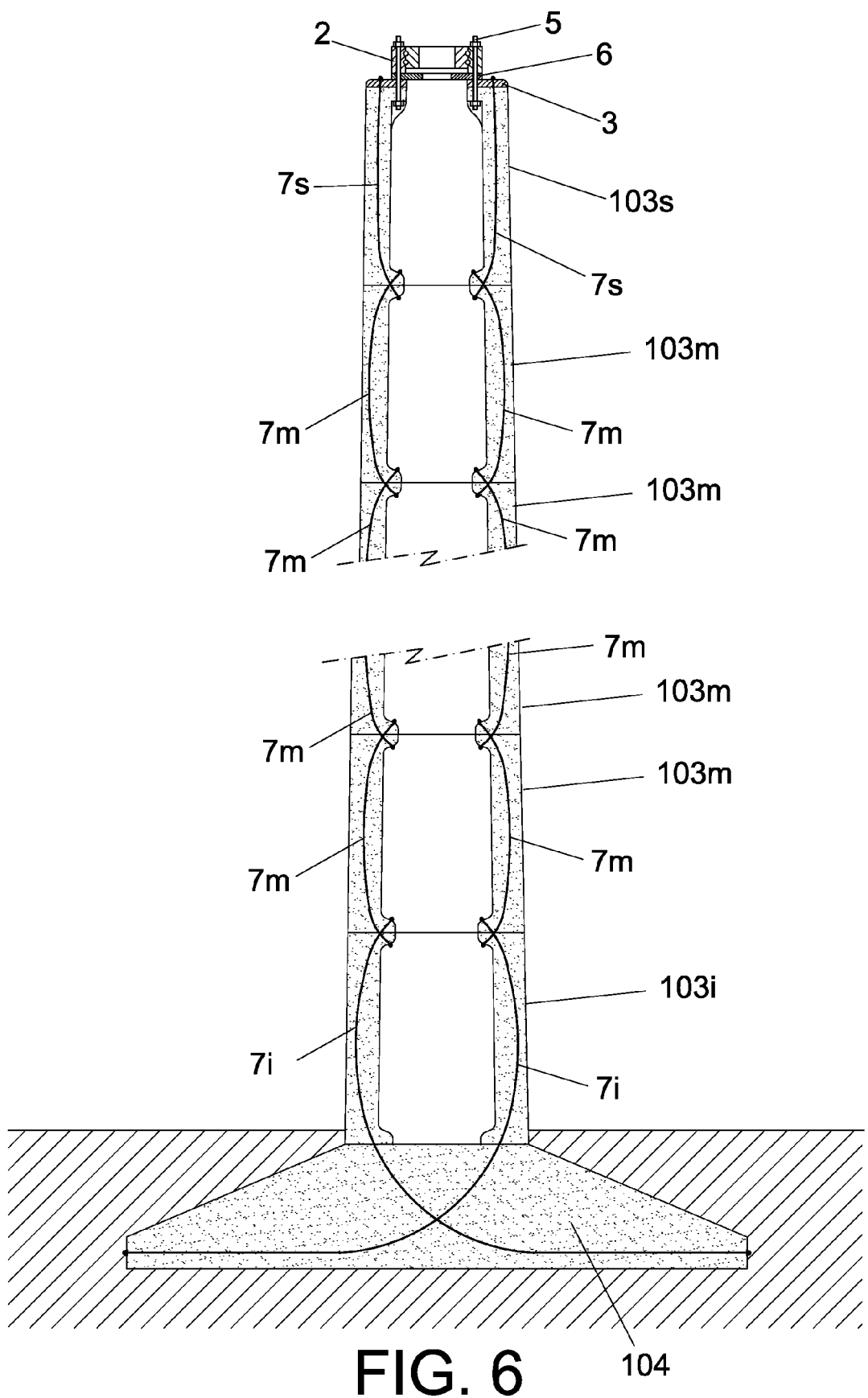
FIG. 6 shows a second example of the joining system in accordance with the present invention.

Finally, FIG. 6 shows a tower (103) of an aerogenerator (100) where the joint between the jaw bearing (2) and the upper annular section (103s) is established in accordance with a second example of the system (1) of the invention. Bolts fixed to the top of the yaw bearing (2) are used as fixing means (5); after penetrating the yaw bearing (2), the flat annular support (3) and the brake disc (6), they are fixed to the bottom of the upper annular section (103s).

Additionally, in this second example, additional tension cables (7s) that serve to improve the fixation of the flat annular support (3) to the upper annular section (103s) are used. These additional tension cables (7s) are fixed to the top of the flat annular support (3) but, instead of being fixed to the bottom of the upper annular section (103s), they penetrate it end-to-end for fixing to the intermediate annular section (103m) disposed immediately below it. Therefore, they not only serve for fixing the flat annular support (3) to the upper annular section (103s), but also compress said upper annular section (103s), thereby avoiding the need for subsequent post-tensioning of the tower in its entirety once the different annular sections are assembled or for installing pre-tensioned sections. Additionally, the cables fix the upper annular section to the intermediate section disposed immediately below it, compressing the horizontal joint between the two sections. Therefore, the joining system (1) of the invention fulfils a triple function that is very advantageous due to the savings in time and labour required for assembling the tower (103).

Additionally, additional tension cables (7m) may be used to establish the joint between the different annular sections. As shown in FIG. 6, in this case the additional tension cables (7m) have the triple function of:

compressing an intermediate annular section (103m), fixing the intermediate annular section (103m) to the annular section immediately below it, and fixing the intermediate annular section (103m) to the section immediately above it, compressing the horizontal joints between the three aforementioned annular sections.

In fact, regardless of the type of joint between the yaw bearing (2) and the upper annular section (103s), the following may be used:

additional tension cables (7s) that penetrate the upper annular section (103s) for fixing to the top of the joining part or parts between the yaw bearing (2) and said upper annular section (103s) and to the bottom of the intermediately lower intermediate annular section (103m);

additional tension cables (7s) that penetrate each intermediate annular section (103m) for fixing to the top of the immediately upper annular section and to the bottom of the immediately lower annular section; and additional tension cables (7s) that penetrate the lower annular section (103i) of the tower (103) for fixing to the top of the immediately upper annular section and to the bottom of the foundation (104) of the tower (103).

The invention claimed is:

1. A system for joining a gondola to a concrete tower of an aerogenerator, where the concrete tower is formed by a lower annular section, one or several intermediate annular sections and an upper annular concrete section, the system comprising:

a flat annular support superimposed to but not embedded in an upper surface of the upper annular concrete section of the tower and subjacent to a lower surface of a yaw bearing that supports the gondola;

the flat annular support comprising a plurality of orifices; and a plurality of joining devices positioned and configured to join the gondola to the upper annular concrete section, each joining device of the plurality of joining devices passing through a respective orifice of the plurality of orifices of the flat annular support, each joining device being inferiorly fixed to the upper annular concrete section of the tower and being superiorly fixed to the yaw bearing, wherein the system is configured to transfer a load from the gondola to the upper surface of the upper annular concrete section.

2. The system of claim 1, wherein the joining devices are evenly distributed over the flat annular support so as to define altogether at least one circumference inscribed on a surface of said flat annular support.

3. The system of claim 1, wherein the joining devices are tension cables.

4. The system of claim 1, wherein at least the upper annular concrete section of the tower is formed by several adjacent prefabricated modules and comprising at least one joint on the upper surface of the upper annular concrete section.

5. The system of claim 1, further comprising a brake disc positioned between a lower surface of the yaw bearing and the upper surface of the upper annular concrete section of the tower.

6. The system of claim 5, wherein the brake disc and the flat annular support comprise a single piece.

7. The system of claim 1, further comprising a plurality of tension cables for fixing the flat annular support to the upper annular concrete section.

8. The system of claim 7, wherein the plurality of tension cables penetrates the upper annular concrete section of the tower and is superiorly fixed to a top of the flat annular support and inferiorly fixed to the immediately lower intermediate annular section.

9. The system of claim 8, wherein each intermediate annular section of the tower comprises a plurality of tension cables fixed to the immediately upper annular concrete section and to the immediately lower annular section.

10. The system of claim 9, wherein the lower annular section of the tower comprises a plurality of additional tension cables fixed to the immediately upper intermediate annular section and to a foundation whereon the tower rests.

11. The system of claim 8, wherein the tension cables are evenly distributed over annular sections so as to define altogether at least one circumference inscribed on a surface of said annular sections.

12. The system of claim 1, wherein a contact surface between the flat annular support and the upper surface of the upper annular concrete section of the tower is filled with high-resistance resin or mortar.

13. The system of claim 1, wherein the upper annular concrete section of the tower further comprises an upper end comprising the upper surface, and wherein a thickness of the upper end of the upper annular concrete section is wider than the thickness of the upper annular concrete section in an area adjacent the upper end of the upper annular concrete section.

* * * * *